United States Patent
Nakano

(10) Patent No.: US 10,552,143 B2
(45) Date of Patent: Feb. 4, 2020

(54) RELAY DEVICE, PROGRAM UPDATE SYSTEM, AND PROGRAM UPDATE METHOD

(71) Applicant: Sumitomo Electric Industries, Ltd., Osaka-shi (JP)

(72) Inventor: Takayuki Nakano, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 16/304,808

(22) PCT Filed: Oct. 11, 2016

(86) PCT No.: PCT/JP2016/080062
§ 371 (c)(1),
(2) Date: Nov. 27, 2018

(87) PCT Pub. No.: WO2017/208475
PCT Pub. Date: Dec. 7, 2017

(65) Prior Publication Data
US 2019/0235855 A1 Aug. 1, 2019

(30) Foreign Application Priority Data

Jun. 2, 2016 (JP) .................................. 2016-110623

(51) Int. Cl.
*G06F 8/65* (2018.01)
*B60R 16/023* (2006.01)
(Continued)

(52) U.S. Cl.
CPC .............. *G06F 8/65* (2013.01); *B60R 16/023* (2013.01); *G06F 13/4204* (2013.01); *H04B 7/14* (2013.01); *H04W 4/48* (2018.02)

(58) Field of Classification Search
CPC . G06F 8/60–71; G06F 13/4204; B60R 16/02; B60R 16/023; B60R 16/0234; H04W 4/48; H04B 7/14
(Continued)

(56) References Cited

U.S. PATENT DOCUMENTS 6,904,325 B2 * 6/2005 Shi ...................... G11C 16/102
700/2
2004/0003153 A1 * 1/2004 Froeschl ........... H04L 12/40169
710/104
(Continued)

FOREIGN PATENT DOCUMENTS

JP  2001-296994 A    10/2001
JP  2001296994 A  *  10/2001
(Continued)

OTHER PUBLICATIONS

Lee, Y. S., et al., A Parallel Re-programming Method for In-vehicle Gateway to save software update time, IEEE International Conference on Information and Automation, Aug. 8-10, 2015, pp. 1497-1502, [retrieved on Sep. 20, 2019], Retrieved from the Internet.*
(Continued)

*Primary Examiner* — Geoffrey R ST Leger
(74) *Attorney, Agent, or Firm* — Baker Botts L.L.P.; Michael A. Sartori

(57) ABSTRACT

One aspect of the present disclosure relates to a relay device communicating with a plurality of control devices that belong to on-vehicle networks. This relay device is provided with: a storage unit configured to store therein a plurality of update programs for simultaneous update required for the plurality of control devices, and topologies of the on-vehicle networks; an in-vehicle communication unit configured to transmit the plurality of update programs to the corresponding control devices, respectively; and a control unit configured to control the in-vehicle communication unit such that,
(Continued)

as for control devices that belong to a plurality of on-vehicle networks that are individually connected to the relay device and are independent from each other, the plurality of update programs corresponding to the control devices are transmitted in parallel with each other.

9 Claims, 12 Drawing Sheets

(51) Int. Cl.
    *H04W 4/48*     (2018.01)
    *G06F 13/42*     (2006.01)
    *H04B 7/14*     (2006.01)

(58) Field of Classification Search
    USPC .................................................. 717/168–178
    See application file for complete search history.

(56) References Cited

U.S. PATENT DOCUMENTS

| | | | | |
|---|---|---|---|---|
| 2011/0160952 | A1* | 6/2011 | Thomas | G06F 8/654 |
| | | | | 701/31.4 |
| 2013/0212571 | A1* | 8/2013 | Matsuura | G06F 8/65 |
| | | | | 717/170 |
| 2014/0208008 | A1* | 7/2014 | Abe | G06F 3/0614 |
| | | | | 711/103 |
| 2015/0039865 | A1* | 2/2015 | Ishigooka | B60R 16/02 |
| | | | | 712/221 |
| 2016/0313715 | A1* | 10/2016 | Fischer | G06F 8/654 |
| 2019/0050219 | A1* | 2/2019 | Seki | B60R 16/02 |

FOREIGN PATENT DOCUMENTS

| | | | | | |
|---|---|---|---|---|---|
| JP | 2006-195766 | A | | 7/2006 | |
| JP | 2006195766 | A | * | 7/2006 | |
| JP | 2007-065856 | A | | 3/2007 | |
| JP | 2007065856 | A | * | 3/2007 | |
| JP | 2010-049464 | A | | 3/2010 | |
| JP | 2010049464 | A | * | 3/2010 | |
| JP | 2010-198155 | A | | 9/2010 | |
| JP | 2010198155 | A | * | 9/2010 | .......... G06F 11/1433 |
| JP | 2010-271891 | A | | 12/2010 | |
| JP | 2010271891 | A | * | 12/2010 | |
| JP | 2011-070307 | A | | 4/2011 | |
| JP | 2011070307 | A | * | 4/2011 | |
| JP | 2012-091755 | A | | 5/2012 | |
| JP | 2012091755 | A | * | 5/2012 | |

OTHER PUBLICATIONS

Kim, J. H., et al., Gateway Framework for In-Vehicle Networks Based on CAN, FlexRay, and Ethernet, IEEE Transactions on Vehicular Technology, vol. 64, Issue: 10, Oct. 2015, pp. 4472-4486, [retrieved on Sep. 20, 2019], Retrieved from the Internet.*

* cited by examiner

FIG. 7

| TASK | REQUIRED TIME | | | | | |
|---|---|---|---|---|---|---|
| | NW1 | | NW2 | RELAY BUFFER TIME | COMPLE-TENESS CHECK | UPDATE |
| | MAIN | NW3 | | | | |
| Δ1 (ECU_A) | 30[s] | | | | 10[s] | 30[s] |
| Δ2 (ECU_F) | | | 10[s] | | 10[s] | 30[s] |
| Δ3 (ECU_D) | 30[s] | 30[s] | | 10[s] | 10[s] | 30[s] |

FIG. 9

| TASK | REQUIRED TIME | | | | | |
|---|---|---|---|---|---|---|
| | NW1 | | NW2 | RELAY BUFFER TIME | COMPLE- TENESS CHECK | UPDATE |
| | MAIN | NW3 | | | | |
| Δ1 (ECU_A) | 30[s] | | | | 10[s] | 30[s] |
| Δ2 (ECU_F) | | | 10[s] | | 10[s] | 30[s] |
| Δ3 (ECU_D) | 120[s] | 120[s] | | UNUSABLE | 10[s] | 20[s] |

FIG. 11

| TASK | REQUIRED TIME | | | | | |
|---|---|---|---|---|---|---|
| | NW1 | | NW2 | RELAY BUFFER TIME | COMPLE-TENESS CHECK | UPDATE |
| | MAIN | NW3 | | | | |
| Δ1 (ECU_A) | 30[s] | | | | 20[s] | 40[s] |
| Δ2 (ECU_B) | 10[s] | | | | 10[s] | 20[s] |
| Δ3 (ECU_C) | 20[s] | | | | 10[s] | 50[s] |

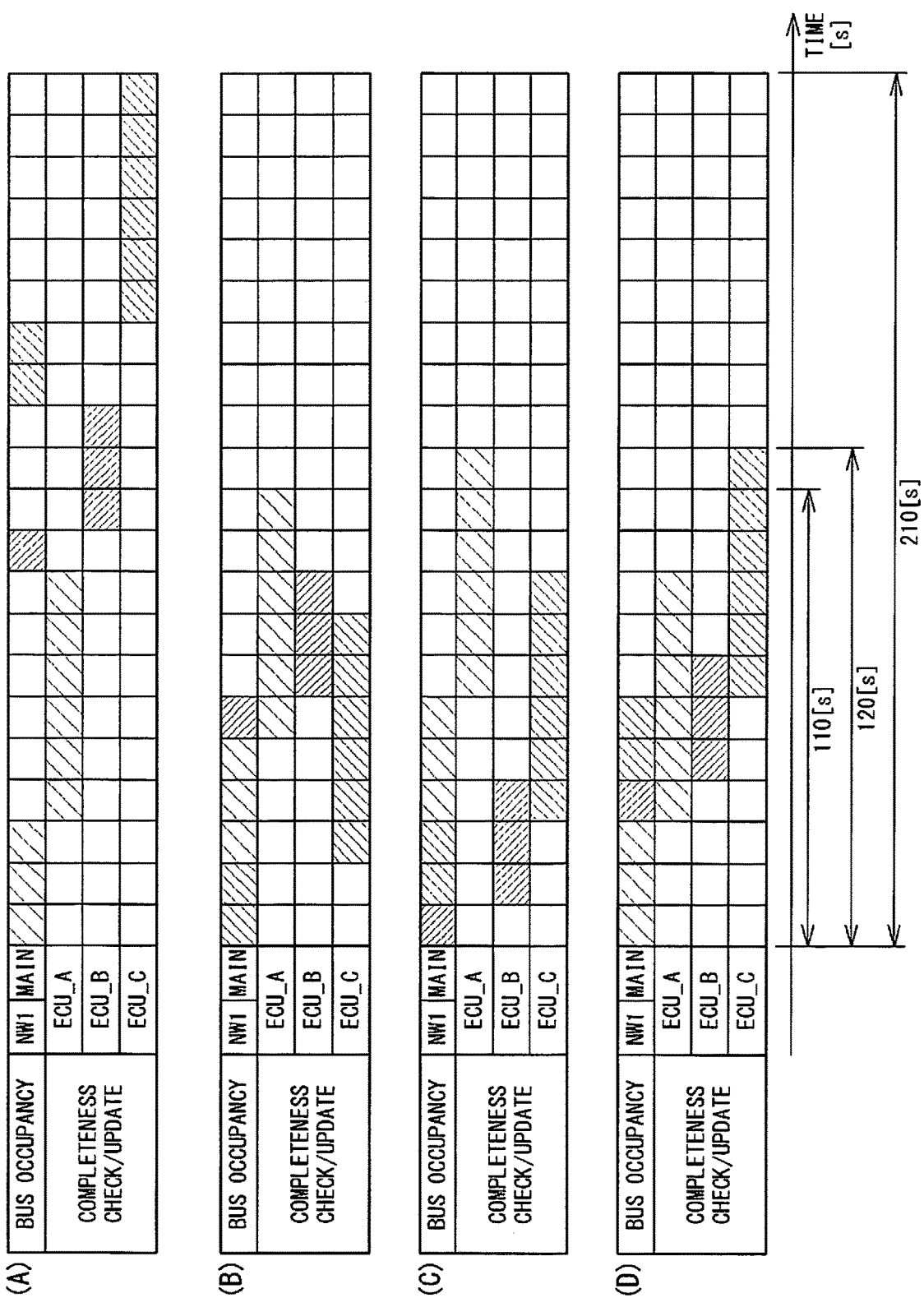

US 10,552,143 B2

RELAY DEVICE, PROGRAM UPDATE SYSTEM, AND PROGRAM UPDATE METHOD

TECHNICAL FIELD

The present invention relates to a relay device, a program update system, and a program update method.

This application claims priority on Japanese Patent Application No. 2016-110623 filed on Jun. 2, 2016, the entire contents of which are incorporated herein by reference.

BACKGROUND ART

A technique has been proposed in which a gateway of an on-vehicle communication device or the like receives, from a management server, update programs for control programs of ECUs (Electronic Control Units) as on-vehicle control devices, and each ECU rewrites the control program from an old version to a new version by using the received update program, thereby remotely executing program update for the ECUs in the vehicle through wireless communication (refer to Patent Literatures 1 and 2).

CITATION LIST

Patent Literature

PATENT LITERATURE 1: Japanese Laid-Open Patent Publication No. 2007-65856
PATENT LITERATURE 2: Japanese Laid-Open Patent Publication No. 2011-70307

SUMMARY OF INVENTION

A relay device according to one aspect is a relay device communicating with a plurality of control devices that belong to on-vehicle networks. The relay device includes: a storage unit configured to store therein a plurality of update programs for simultaneous update required for the plurality of control devices, and topologies of the on-vehicle networks; an in-vehicle communication unit configured to transmit the plurality of update programs to the corresponding control devices, respectively; and a control unit configured to control the in-vehicle communication unit such that, as for control devices that belong to a plurality of on-vehicle networks that are individually connected to the relay device and are independent from each other, the plurality of update programs corresponding to the control devices are transmitted in parallel with each other.

A program update system according to another aspect is a program update system including a plurality of control devices belonging to on-vehicle networks, and a relay device communicating with the plurality of control devices. The relay device includes: a storage unit configured to store therein a plurality of update programs for simultaneous update required for the plurality of control devices, and topologies of the on-vehicle network; an in-vehicle communication unit configured to transmit the plurality of update programs to the corresponding control devices, respectively; and a control unit configured to control the in-vehicle communication unit such that, as for control devices that belong to a plurality of on-vehicle networks that are individually connected to the relay device and are independent from each other, the plurality of update programs corresponding to the control devices are transmitted in parallel with each other.

A program update method according to still another aspect is a program update method executed by a relay device communicating with a plurality of control devices that belong to on-vehicle networks. The method includes the steps of: storing a plurality of update programs for simultaneous update required for the plurality of control devices, and topologies of the on-vehicle networks; and transmitting the plurality of update programs to the corresponding control devices. In the step of transmitting the plurality of update programs, as for control devices that belong to a plurality of on-vehicle networks that are individually connected to the relay device and are independent from each other, the plurality of update programs corresponding to the control devices are transmitted in parallel with each other.

BRIEF DESCRIPTION OF DRAWINGS

FIG. 7 is a diagram showing a first specific example of update programs required for simultaneous update.
FIG. 9 is a diagram showing a second specific example of update programs required for simultaneous update.
FIG. 11 is a diagram showing a third specific example of update programs required for simultaneous update.
FIG. 12 is a diagram showing an update schedule (A) in the case where the scheduling process is not performed and update schedules (B) to (D) in the case where the scheduling process is performed according to scheduling conditions A to C, respectively, in comparison with each other.

DESCRIPTION OF EMBODIMENTS

Figure 1:
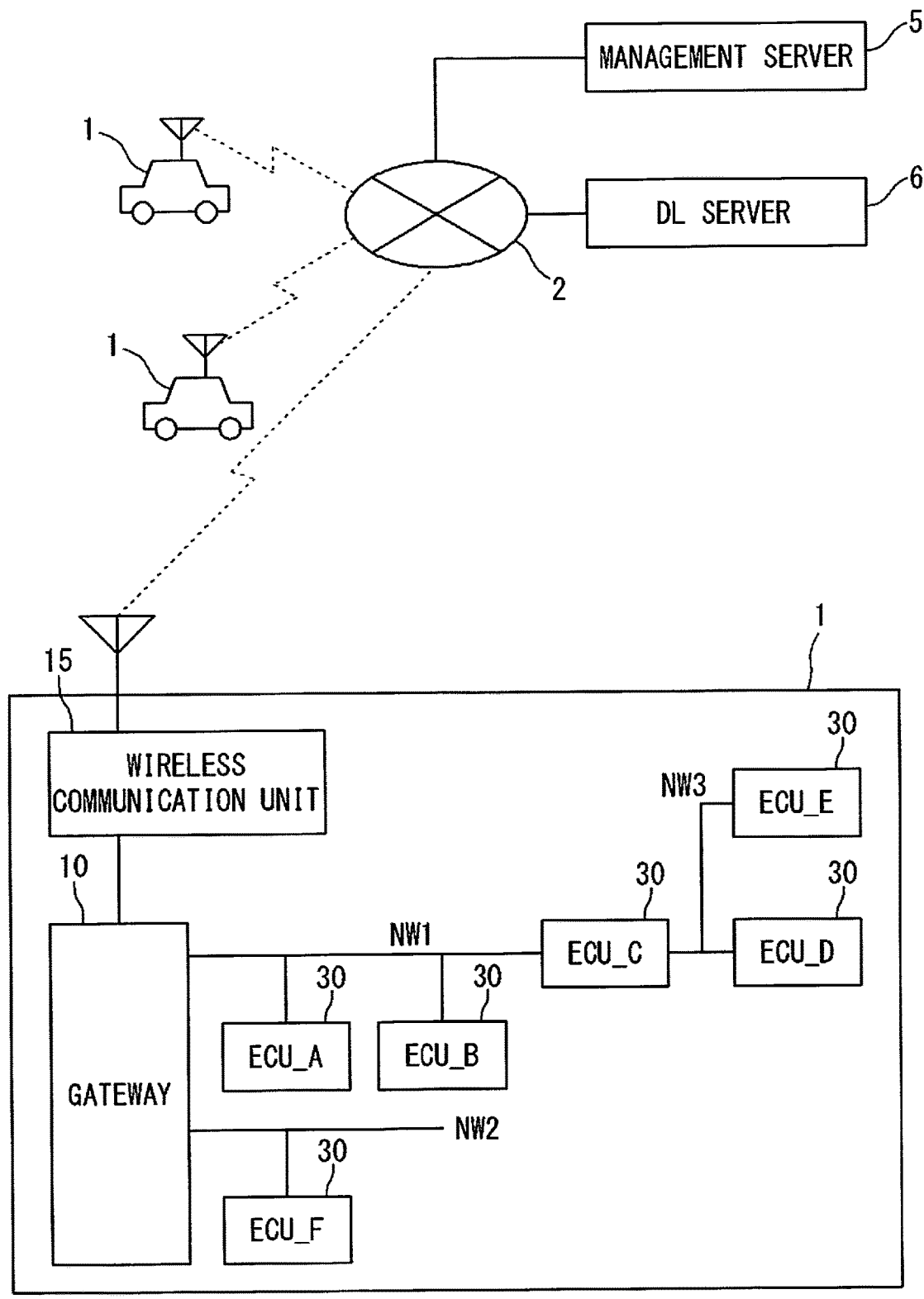
FIG. 1 is a diagram showing an overall configuration of a program update system according to an embodiment of the present disclosure.

Problems to be Solved by the Present Disclosure

In a recent vehicle, many types of equipment are operated in conjunction with each other. Therefore, in order to ensure the operation of the vehicle, a plurality of programs, which are control programs for a plurality of ECUs related to each other, may be required to be updated at the same timing. Update of each control program is performed such that a program for update is provided to the corresponding ECU, and the ECU rewrites the control program. Therefore, a "required update time", which is a time required for update of a control program in one ECU, includes a time required for transmitting an update program to the ECU, and a time required for rewriting the control program.

When control programs of a plurality of ECUs need to be updated at the same timing, each of the ECUs executes the aforementioned operation for update. In a vehicle, once updates of control programs of a plurality of ECUs related to each other are started, the vehicle cannot be operated until the updates of the control programs of the ECUs are completed. In other words, the vehicle cannot be operated during a time period from start of transmission of the first update program to an ECU, among a plurality of update programs for a plurality of control programs to be updated at the same timing, to completion of rewriting in an ECU by using the last update program (hereinafter, this time period is referred to as "required simultaneous-update time").

If the plurality of ECUs that need to update the control programs thereof at the same timing perform update sequentially, the required simultaneous-update time is the sum of the required update times in the respective ECUs, and therefore is long. The longer the required simultaneous-update time is, the longer the time period will be during which the vehicle cannot be operated.

The present disclosure has been made in view of the aforementioned problems, and an object of the present disclosure is to provide a relay device, a program update system, and a program update method which are able to reduce the required simultaneous-update time when a plurality of programs are updated at the same timing.

Effect of the Disclosure

According to this disclosure, it is possible to reduce the required simultaneous-update time of control programs of control devices installed in a vehicle.

Description of Embodiments

Embodiments of the present disclosure include at least the following.

That is, a relay device according to one embodiment is a relay device communicating with a plurality of control devices that belong to on-vehicle networks. The relay device includes: a storage unit configured to store therein a plurality of update programs for simultaneous update required for the plurality of control devices, and topologies of the on-vehicle networks; an in-vehicle communication unit configured to transmit the plurality of update programs to the corresponding control devices, respectively; and a control unit configured to control the in-vehicle communication unit such that, as for control devices that belong to a plurality of on-vehicle networks that are individually connected to the relay device and are independent from each other, the plurality of update programs corresponding to the control devices are transmitted in parallel with each other.

According to this configuration, among the plurality of update programs for simultaneous update, as for the update programs for the control devices that belong to the plurality of on-vehicle networks that are individually connected to the relay device and are independent from each other, transmissions of these update programs from the relay device can be started at the same time. Therefore, the sum of the transmission time periods of these update programs can be reduced as compared with the case where these update programs are sequentially transmitted after completion of rewriting of the corresponding control programs. As a result, the required simultaneous-update time can be reduced.

Preferably, in the relay device, the control unit determines a transmission order of the plurality of update programs in accordance with a predetermined condition.

When an appropriate condition is set in the relay device, the sum of the time periods required for transmission of the plurality of update programs for simultaneous update can be reduced. As a result, the required simultaneous-update time can be reduced.

Preferably, the predetermined condition is a scheduling condition that allows a required simultaneous-update time to be minimized, the required simultaneous-update time being a combination of a first time period, a second time period, and a third time period, described below, in each of the control devices, and the required simultaneous-update time is a time period from start of the first time period with respect to an update program to be transmitted first to the corresponding control device, among the plurality of update programs, to end of the third time period with respect to an update program with which rewriting of a control program is completed last, among the plurality of update programs, first time period: a transmission time of each update program, second time period: a time required for checking of each update program, and third time period: a time required for rewriting a control program using each update program.

According to this configuration, the sum of the time periods required for transmission of the plurality of update programs for simultaneous update can be reduced. As a result, the required simultaneous-update time can be reduced.

Preferably, the scheduling condition includes a condition that, as for a plurality of control devices included in one of the on-vehicle networks which is a bus-type topology, a control device having a longer third time period is given an update program earlier in the transmission order of the update programs.

According to this configuration, an update program that requires a longer time for rewriting of the corresponding control program is transmitted earlier, and rewriting of the control program is started earlier. In parallel with the rewriting of the control program, a next update program is transmitted. Therefore, the required simultaneous-update time can be reduced as compared with the case where the update programs are sequentially transmitted after completion of rewriting of the corresponding control programs.

Preferably, the scheduling condition includes a condition that, as for a plurality of control devices included in one of the on-vehicle networks which is a bus-type topology, a control device having a shorter first time period is given an update program earlier in the transmission order of the update programs.

According to this configuration, as for each update program, checking of the update program and rewriting of a control program in the corresponding control device can be started earlier. Further, a next update program is transmitted in parallel with the checking of the update program and the rewriting of the control program. Therefore, the required simultaneous-update time can be further reduced as compared with the case where the update programs are sequentially transmitted after completion of rewriting of the corresponding control programs.

Preferably, the scheduling condition includes a condition that, as for a plurality of control devices included in one of the on-vehicle networks which is a bus-type topology, the transmission order is determined based on identification information assigned to the control devices.

According to this configuration, the required simultaneous-update time can be further reduced by assigning suitable identification information such as names to the respective control devices in advance.

Preferably, when one of the on-vehicle networks includes a main network connected directly to the relay device, and a local network that branches from the main network with a control device included in the main network being a branch node, the scheduling condition includes a condition that transmission to a control device that belongs to the local network is performed earlier than transmission to a control device that belongs to the main network.

According to this configuration, a next update program can be transmitted via the main network in parallel with transmission of an update program in the local network, whereby the sum of the transmission time periods of the plurality of update programs can be reduced. As a result, the required simultaneous-update time can be further reduced.

Preferably, the control unit determines a transmission speed in the main network in accordance with whether or not the branch node has a buffer function for absorbing a difference between the transmission speed in the main network and a transmission speed in the local network.

According to this configuration, transmission of update programs in the main network can be efficiently performed, whereby the sum of the transmission time periods of the plurality of update programs can be reduced.

A program update system according to another embodiment is a program update system including a plurality of control devices belonging to on-vehicle networks, and a relay device communicating with the plurality of control devices. The relay device includes: a storage unit configured to store therein a plurality of update programs for simultaneous update required for the plurality of control devices, and topologies of the on-vehicle network; an in-vehicle communication unit configured to transmit the plurality of update programs to the corresponding control devices, respectively; and a control unit configured to control the in-vehicle communication unit such that, as for control devices that belong to a plurality of on-vehicle networks that are individually connected to the relay device and are independent from each other, the plurality of update programs corresponding to the control devices are transmitted in parallel with each other.

According to this configuration, among the plurality of update programs for simultaneous update, as for the update programs for the control devices that belong to the plurality of on-vehicle networks that are individually connected to the relay device and are independent from each other, transmissions of these update programs from the relay device can be started at the same time. Therefore, the sum of the transmission time periods of these update programs can be reduced as compared with the case where these update programs are sequentially transmitted after completion of rewriting of the corresponding control programs. As a result, the required simultaneous-update time can be reduced.

A program update method according to still another embodiment is a program update method executed by a relay device communicating with a plurality of control devices that belong to on-vehicle networks. The method includes the steps of: storing a plurality of update programs for simultaneous update required for the plurality of control devices, and topologies of the on-vehicle networks; and transmitting the plurality of update programs to the corresponding control devices. In the step of transmitting the plurality of update programs, as for control devices that belong to a plurality of on-vehicle networks that are individually connected to the relay device and are independent from each other, the plurality of update programs corresponding to the control devices are transmitted in parallel with each other.

According to this configuration, among the plurality of update programs for simultaneous update, as for the update programs for the control devices that belong to the plurality of on-vehicle networks that are individually connected to the relay device and are independent from each other, transmissions of these update programs from the relay device can be started at the same time. Therefore, the sum of the transmission time periods of these update programs can be reduced as compared with the case where these update programs are sequentially transmitted after completion of rewriting of the corresponding control programs. As a result, the required simultaneous-update time can be reduced.

DETAILED DESCRIPTION OF EMBODIMENT

Hereinafter, preferred embodiments will be described with reference to the drawings. In the following description, the same reference numerals refer to the same components and constituent elements. The names and functions thereof are also the same. Therefore, repeated description thereof is not necessary.

First Embodiment

[Overall Configuration of System]

FIG. 1 is a diagram showing an overall configuration of a program update system according to an embodiment of the present disclosure.

As shown in FIG. 1, the program update system of this embodiment includes vehicles 1, a management server 5, and a DL (download) server 6 which are able to communicate with each other via a wide-area communication network 2.

The management server 5 and the DL server 6 are operated by, for example, the automobile manufacturer of the vehicles 1, and are able to communicate with a large number of vehicles 1 owned by users registered as members in advance.

Each vehicle 1 is equipped with a gateway 10, a wireless communication unit 15, a plurality of ECUs 30, and various on-vehicle devices (not shown) controlled by the respective ECUs 30.

Communication groups (on-vehicle networks), each being formed by a plurality of ECUs 30 bus-connected to a common in-vehicle communication line, are present in the vehicle 1, and the gateway 10 functions as a relay device that relays communication between the communication groups and communication between each ECU 30 and external devices. Therefore, a plurality of in-vehicle communication lines are connected to the gateway 10.

Specifically, a plurality of buses, each having one or more ECUs 30 connected thereto to form a communication group, are connected to the gateway 10, whereby network topologies are formed. For example, as shown in FIG. 1, a first bus NW1 and a second bus NW2, which are main buses, are connected to the gateway 10. Three ECUs (ECU_A, ECU_B and ECU_C) 30 are connected to the bus NW1. One ECU (ECU_F) 30 is connected to the bus NW2. A network topology in which the three ECUs (ECU_A, ECU_B and ECU_C) 30 are connected to the main bus NW1, and a network topology in which the one ECU (ECU_F) 30 is connected to the main bus NW2, are bus type topologies. Each of the main buses NW1 and NW2 serving as transmission paths can be shared by the plurality of ECUs connected thereto. Therefore, in order to avoid collision and/or interference of signals, each main bus has to be controlled so that signals are not simultaneously transmitted therethrough.

Any of the plurality of ECUs 30 may be further connected to a local bus. For example, in FIG. 1, the bus NW1 branches to a third bus NW3 as a local bus, with one ECU (ECU_C) 30 connected thereto being a branch node. Two ECUs (ECU_E and ECU_D) 30 are further connected to the bus NW3, thereby forming a bus type topology. The ECU_C relays transmission of signals between the gateway 10 and the two ECUs (ECU_E and ECU_D) 30 connected to the bus NW3.

The wireless communication unit 15 is communicably connected to the wide-area communication network 2 such as a mobile phone network, and is connected to the gateway 10 via an in-vehicle communication line. The gateway 10 transmits, to the ECUs 30, information that has been received from external devices such as the management server 5 and the DL server 6 via the wide-area communication network 2 by the wireless communication unit 15.

The gateway 10 transmits information obtained from the ECUs 30 to the wireless communication unit 15, and the wireless communication unit 15 transmits the information to the external devices such as the management server 5.

While in FIG. 1 the gateway 10 is connected to the wireless communication unit 15 via the in-vehicle communication line, the gateway 10 and the wireless communication unit 15 may be configured as a single device.

While in the program update system shown in FIG. 1 the management server 5 and the DL server 6 are configured as separate servers, these servers 5 and 6 may be configured as a single server device.

[Internal Configuration of Gateway]

Figure 2:
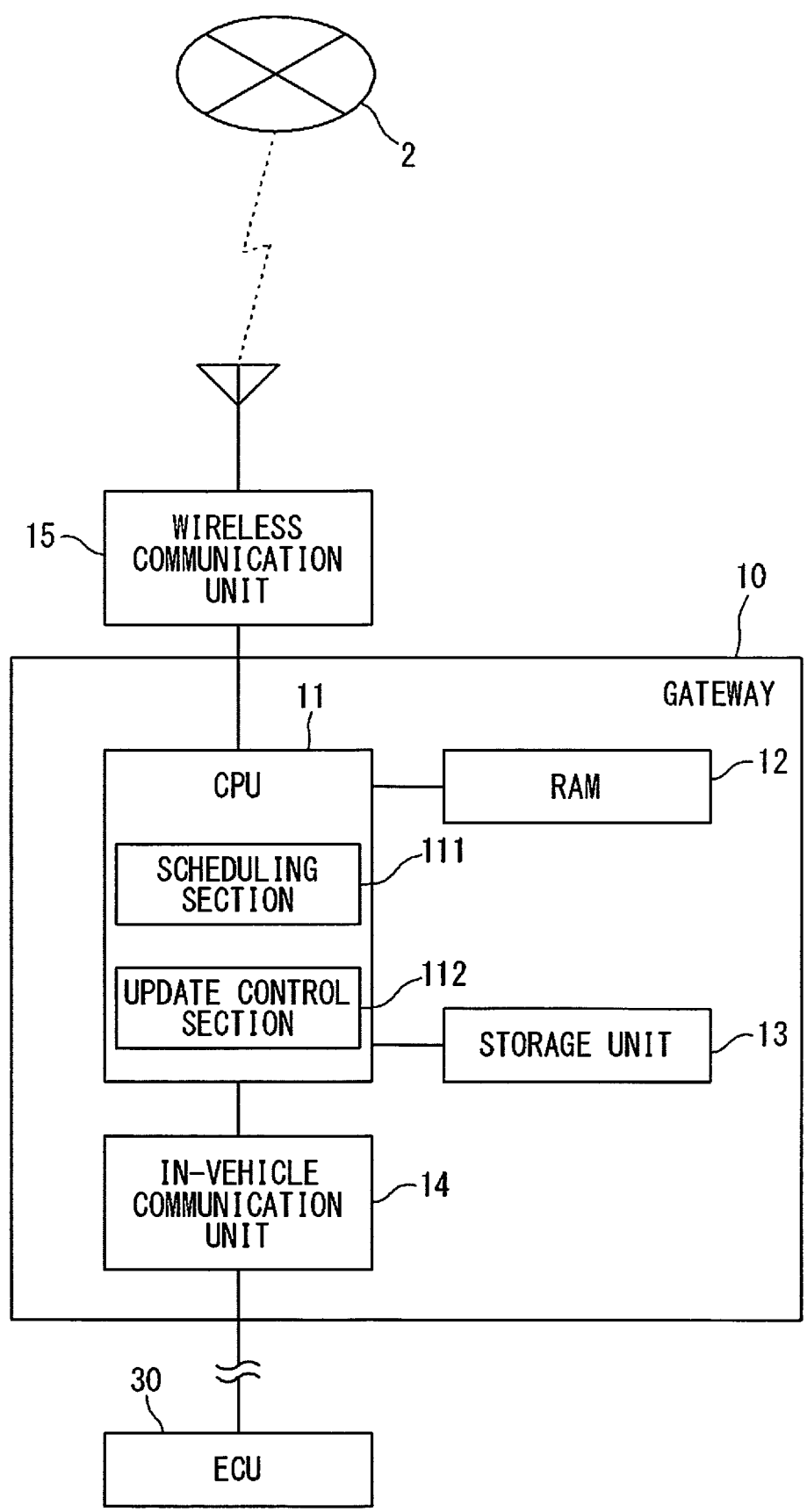
FIG. 2 is a block diagram showing an internal configuration of a gateway.

FIG. 2 is a block diagram showing the internal configuration of the gateway 10.

As shown in FIG. 2, the gateway 10 includes a CPU (Central Processing Unit) 11, an RAM (Random Access Memory) 12, a storage unit 13, an in-vehicle communication unit 14, and the like. While the gateway 10 is connected to the wireless communication unit 15 via the in-vehicle communication line, the gateway 10 and the wireless communication unit 15 may be configured as a single unit.

The CPU 11 causes the gateway 10 to function as a relay device for relaying various kinds of information, by reading out one or a plurality of programs stored in the storage unit 13 to the RAM 12 and executing the read program.

The CPU 11 can execute a plurality of programs in parallel by switching between the plurality of programs in a time sharing manner, for example. The CPU 11 may be a CPU representing a plurality of CPU groups. In this case, a function to be implemented by the CPU 11 is a function to be implemented by the plurality of CPU groups in cooperation with each other. The RAM 12 is a memory element such as an SRAM (Static RAM) or a DRAM (Dynamic RAM), and temporarily stores therein programs to be executed by the CPU 11, data required in executing the programs, and the like.

A computer program implemented by the CPU 11 can be transferred in a state of being recorded in a well-known recording medium such as a CD-ROM or a DVD-ROM, or may be transferred by data transmission (download) from a computer device such as a server computer.

In this aspect, the same applies to a computer program to be executed by a CPU 31 of the ECU 30 (refer to FIG. 3) described later, and a computer program to be executed by a CPU 51 of the management server 5 (refer to FIG. 4) described later.

The storage unit 13 is configured as, for example, a nonvolatile memory element such as a flash memory or an EEPROM (Electrically Erasable Programmable Read Only Memory).

The storage unit 13 has a storage area in which programs to be executed by the CPU 11, data required in executing the programs, and the like are stored. In the storage unit 13, update programs and the like for the respective ECUs 30, received from the DL server 6, are also stored. Further, in the storage unit 13, the topologies of the on-vehicle networks formed by the ECUs 30 and the buses NW1 to NW3, are also stored. The topologies of the on-vehicle networks are used for transmission of update programs and a scheduling process described later.

The plurality of ECUs 30 are connected to the in-vehicle communication unit 14 via the in-vehicle communication lines arranged in the vehicle 1. The in-vehicle communication unit 14 communicates with the ECUs 30 in accordance with a standard such as CAN (Controller Area Network), CANFD (CAN with Flexible Data Rate), LIN (Local Interconnect Network), Ethernet (registered trademark), or MOST (Media Oriented Systems Transport: MOST is a registered trademark), for example.

The in-vehicle communication unit 14 transmits information provided from the CPU 11 to target ECUs 30, and provides information received from the ECUs 30 to the CPU 11. The in-vehicle communication unit 14 may communicate with the ECUs 30 in accordance with other communication standards used for the on-vehicle networks, apart from the above communication standards.

The wireless communication unit 15 consists of a wireless communication apparatus including an antenna and a communication circuit that executes transmission/reception of radio signals through the antenna. The wireless communication unit 15 is able to communicate with the external devices when being connected to the wide-area communication network 2 such as a mobile phone network.

The wireless communication unit 15 transmits information provided from the CPU 11 to the external devices such as the management server 5 via the wide-area communication network 2 formed by a base station (not shown), and provides information received from the external devices to the CPU 11.

Instead of the wireless communication unit 15 shown in FIG. 2, a wired communication unit that serves as a relay device inside the vehicle 1 may be adopted. The wired communication unit has a connector to which a communication cable conforming to a standard such as USB (Universal Serial Bus) or RS232C is connected, and performs wired communication with another communication device connected thereto via the communication cable.

If the other communication device and the external device such as the management server 5 can wirelessly communicate with each other via the wide-area communication network 2, the external device and the gateway 10 are able to communicate with each other through a communication path consisting of, in order, the external device, the other communication device, the wired communication unit, and the gateway 10.

[Internal Configuration of ECU]

Figure 3:
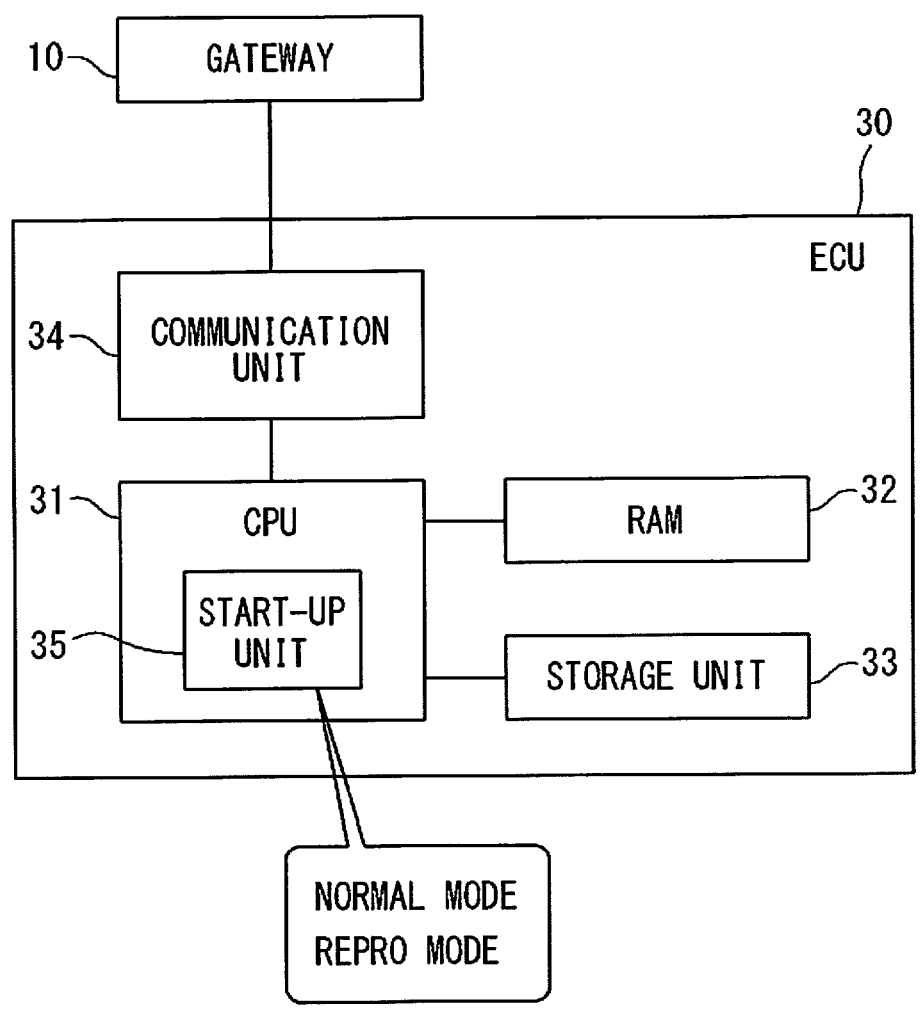
FIG. 3 is a block diagram showing an internal configuration of an ECU.

FIG. 3 is a block diagram showing the internal configuration of an ECU 30. As shown in FIG. 3, the ECU 30 includes a CPU 31, an RAM 32, a storage unit 33, a communication unit 34, and the like. The ECU 30 is an on-vehicle control device that individually controls a target device installed in the vehicle 1. Examples of the types of the ECU 30 include an engine control ECU, a steering control ECU, and a door lock control ECU.

The CPU 31 controls the operation of a target device that the CPU 31 is in charge of, by reading out one or a plurality of programs previously stored in the storage unit 33 to the RAM 32 and executing the read programs. The CPU 31 may also be a CPU representing a plurality of CPU groups, and a control to be performed by the CPU 31 may be a control to be performed by the plurality of CPU groups in cooperation with each other.

The RAM 32 is a memory element such as an SRAM or a DRAM, and temporarily stores therein programs to be executed by the CPU 31, data required in executing the programs, and the like.

The storage unit 33 is configured as, for example, a nonvolatile memory element such as a flash memory or an EEPROM, or a magnetic storage device such as a hard disk.

Information stored in the storage unit 33 includes, for example, a computer program (hereinafter referred to as "control program") that causes the CPU 31 to execute information processing for controlling a target device to be controlled, inside the vehicle.

The gateway 10 is connected to the communication unit 34 via the in-vehicle communication lines arranged in the vehicle 1. The communication unit 34 communicates with the gateway 10 in accordance with a standard such as CAN, Ethernet, or MOST, for example.

The communication unit 34 transmits information provided from the CPU 31 to the gateway 10, and provides information received from the gateway 10 to the CPU 31. The communication unit 34 may communicate with the gateway 10 in accordance with other communication standards that are used for the on-vehicle network, apart from the above communication standards.

The CPU 31 of the ECU 30 includes a start-up unit 35 that switches the mode of control performed by the CPU 31, between a "normal mode" and a "reprogramming mode" (hereinafter also referred to as "repro mode").

The normal mode is a control mode in which the CPU 31 of the ECU 30 executes original control for the target device (e.g., engine control for a fuel engine, or door lock control for a door lock motor).

The reprogramming mode is a control mode in which the CPU 31 updates the control program used for controlling the target device.

That is, the reprogramming mode is a control mode in which the CPU 31 performs erasing/rewriting of the control program from/on an ROM area in the storage unit 33. Only when the CPU 31 is in this control mode, the CPU 31 is allowed to update the control program stored in the ROM area in the storage unit 33 to a new version of the control program.

When the CPU 31, in the repro mode, writes the new version of the control program into the storage unit 33, the start-up unit 35 temporarily restarts (resets) the ECU 30, and executes a verifying process on a storage area where the new version of the control program has been written.

After completion of the verifying process, the start-up unit 35 operates the CPU 31 with the updated control program.

[Internal Configuration of Management Server]

Figure 4:
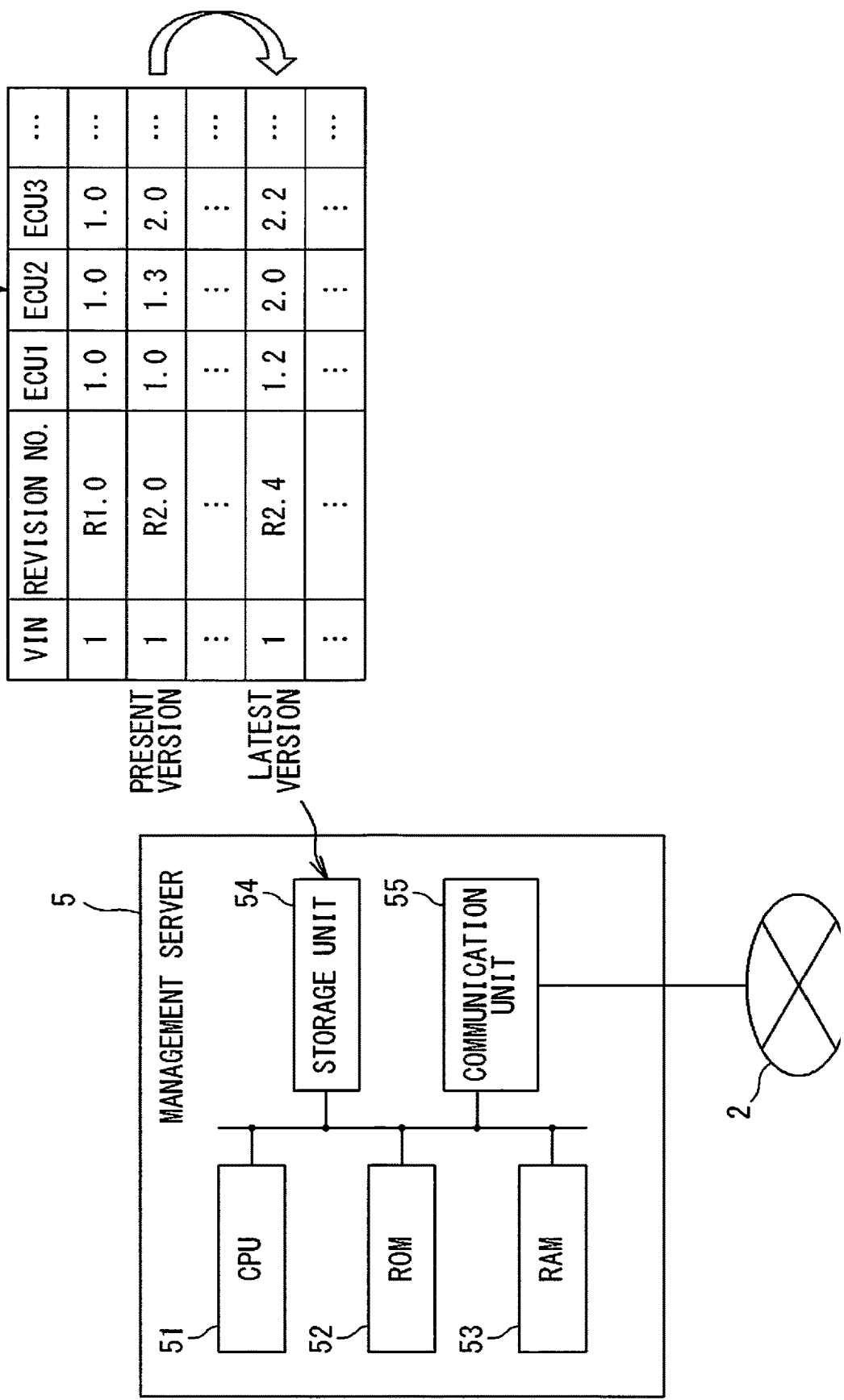
FIG. 4 is a block diagram showing an internal configuration of a management server.

FIG. 4 is a block diagram showing the internal structure of the management server 5.

As shown in FIG. 4, the management server 5 includes a CPU 51, an ROM 52, an RAM 53, a storage unit 54, a communication unit 55, and the like.

By reading out one or a plurality of programs previously stored in the ROM 52 to the RAM 53 and executing the read programs, the CPU 51 controls the operation of each hardware component, and causes the management server 5 to function as an external device that is able to communicate with the gateway 10. The CPU 51 may also be a CPU representing a plurality of CPU groups, and a function to be implemented by the CPU 51 may be a function to be implemented by the plurality of CPU groups in cooperation with each other.

The RAM 53 is a memory element such as an SRAM or a DRAM, and temporarily stores therein programs to be executed by the CPU 51, data required in executing the programs, and the like.

The storage unit 54 is configured as, for example, a nonvolatile memory element such as a flash memory or an EEPROM, or a magnetic storage device such as a hard disk.

The communication unit 55 is configured as a communication device that executes a communication process in accordance with a predetermined communication standard. The communication unit 55 executes the communication process when being connected to the wide-area communication network 2 such as a mobile phone network. The communication unit 55 transmits information provided from the CPU 51 to external devices via the wide-area communication network 2, and provides information received via the wide-area communication network 2 to the CPU 51.

As shown in FIG. 4, information stored in the storage unit 54 includes a revision table RT in which the versions of control programs of ECUs 30 installed in the vehicle 1 are stored (in FIG. 4, identification numbers of 1 to 3 are assigned to ECUs 30 installed in a vehicle 1 having VIN=1).

The revision table RT tabulates: vehicle identification numbers (VIN) of vehicles 1; revision numbers as identification information representing revision-up histories of the respective vehicle identification numbers; and the versions of the ECUs 1 to 3 corresponding to the respective revision numbers.

In the revision table RT shown in FIG. 4, the versions of the control programs of the respective ECUs 1 to 3, which are included in the same revision number, have been subjected to validation by the automobile manufacturer.

For example, in the case of "R2.0" that is the current revision number, version 1.0 of control program for the ECU 1, version 1.3 of control program for the ECU 2, and version 2.0 of control program for the ECU 3 have been subjected to validation.

In the case of "R2.4" that is the latest revision number, version 1.2 of control program for the ECU 1, version 2.0 of control program for the ECU 2, and version 2.2 of control program for the ECU 3 have been subjected to validation.

Accordingly, in the case where the vehicle 1 is revised from R2.0 to R2.4, version upgrade from 1.0 to 1.2 for the ECU 1, version upgrade (update) from 1.3 to 2.0 for the ECU 2, and version upgrade (update) from 2.0 to 2.2 for the ECU 3 have to be performed at the same timing. Here, the "same timing" means a time during which a plurality of ECUs 30 shift into the repro mode in response to a request from the gateway 10, are reset in response to a request from the gateway 10, and return into the normal mode after completion of the verifying process. In the description below, update of a plurality of control programs at the "same timing" in the above meaning is also referred to as "simultaneous update".

In the revision table RT shown in FIG. 4, only the version information in the case of the vehicle identification number VIN=1 is shown as one example.

However, in the revision table RT actually held by the management server 5, version information similar to above is recorded for each of the vehicle identification numbers (VIN) of all the vehicles 1 owned by the registered members of the management server 5. In the DL server 6, a plurality of update programs relating to all the ECUs 30 are stored.

When being notified of a vehicle identification number and the current versions of control programs of the ECUs 1 to 3 from the gateway 10, the CPU 51 collates the notified version information with the latest versions, corresponding to the vehicle identification number, included in the revision table RT.

When the result of the collation is that the version information of the ECUs 1 to 3 notified from the gateway 10 is not the latest one, the CPU 51 transmits, to the gateway 10, a URL where update programs for update to the latest versions are stored, and a download request.

[Sequence of Simultaneous Update of Control Program]

Figure 5:
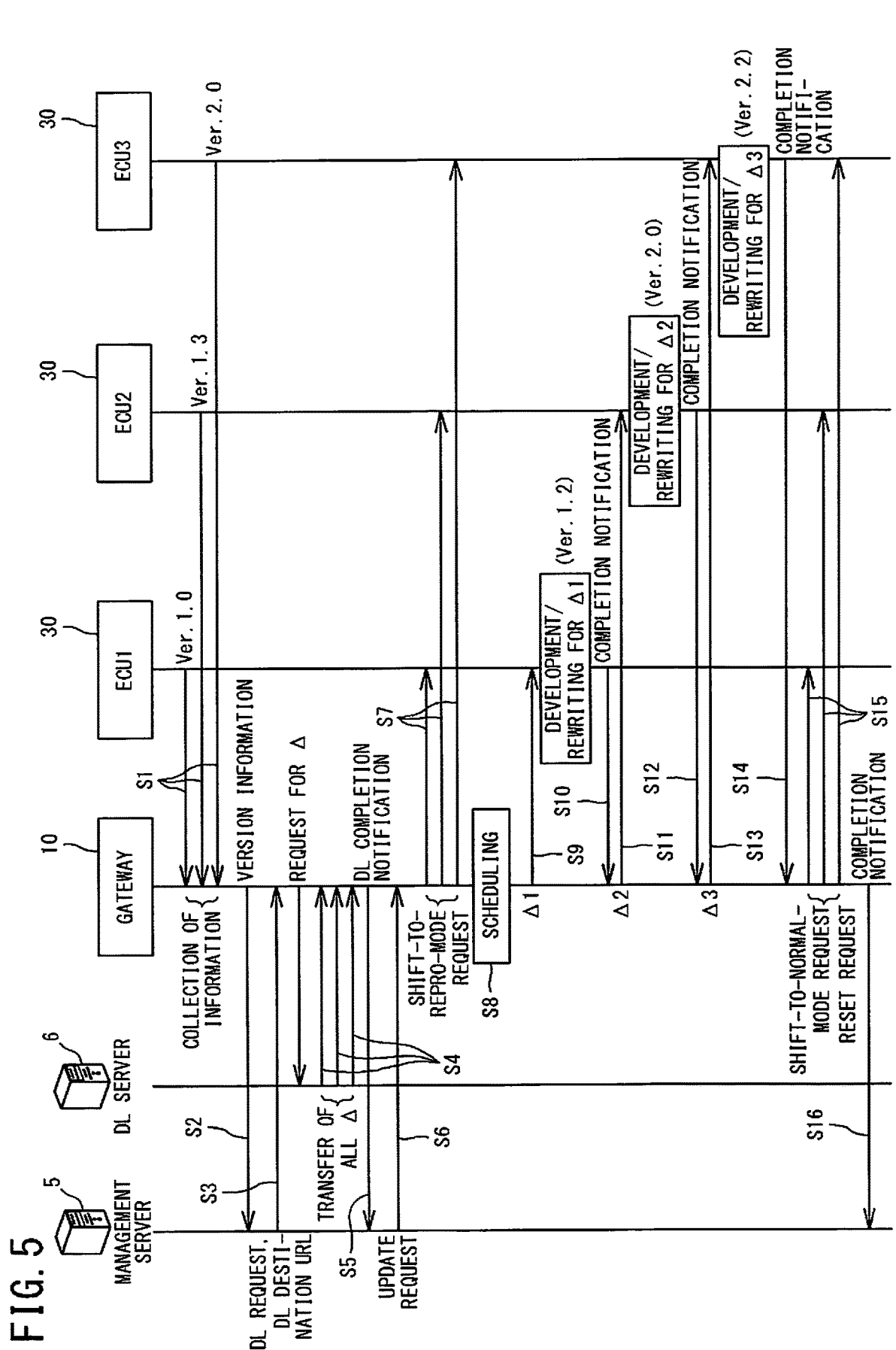
FIG. 5 is a sequence diagram showing an example of simultaneous update of control programs of a plurality of ECUs.

FIG. 5 is a sequence diagram showing an example of simultaneous update of control programs for a plurality of ECUs 1 to 3, which is executed in the program update system of the present embodiment. In the following description, it is assumed that the control programs of the respective ECUs 1 to 3 are updated as follows in accordance with the revision table RT shown in FIG. 4.

Revision number: R2.0→R2.4
ECU 1: version 1.0→version 1.2
ECU 2: version 1.3→version 2.0
ECU 3: version 2.0→version 2.2

Although each update program may be a new version of a control program itself, it is assumed in this embodiment that each update program is a difference program from an old version. In this case, if an update program Δ including difference information of files of the old version and the new version is stored in the same storage area, update to the new version can be achieved by applying the update program Δ to the old version.

It is assumed that an update program from version 1.0 to version 1.2 for the ECU 1 is "Δ1", an update program from version 1.3 to version 2.0 for the ECU 2 is "Δ2", and an update program from version 2.0 to version 2.2 for the ECU 3 is "Δ3".

As shown in FIG. 5, in the simultaneous update of the control programs according to the present embodiment, for example, the gateway 10 collects information of the current versions of the control programs of the ECUs 1 to 3 (step S1).

In the example of FIG. 5, the current version of the control program of the ECU 1 is "1.0", the current version of the control program of the ECU 2 is "1.3", and the current version of the control program of the ECU 3 is "2.0".

Next, the gateway 10 transmits, to the management server 5, the collected version information of the control programs of the ECUs 1 to 3, and the vehicle identification number (VIN) of the own vehicle (step S2).

Based on the version information and the vehicle identification number notified from the gateway 10, the management server 5 searches the aforementioned revision table RT (refer to FIG. 4) to determine whether or not the control programs of the ECUs 1 to 3 of the vehicle 1 have to be updated at the same timing.

Since the ECU 1 is in version 1.0, the ECU 2 is in version 1.3, and the ECU 3 is in version 2.0, the management server 5 determines that the vehicle 1 is operated at revision R2.0.

Since the latest revision R2.4 is present, the management server 5 determines that update of the ECU 1 to version 1.2, update of the ECU 2 to version 2.0, and update of the ECU 3 to version 2.2 have to be performed at the same timing.

Therefore, the management server 5 transmits URLs where the update programs Δ1 to Δ3 for the ECUs 1 to 3 are stored and a download request to the gateway 10 that has transmitted the version information (step S3).

Then, the gateway 10 downloads the update programs Δ1 to Δ3 for the ECUs 1 to 3 from the DL server 6 (step S4). The gateway 10 temporarily stores and preserves the received update program Δ1 to Δ3 in the storage unit 13 thereof.

Upon completion of storage of the update programs Δ1 to Δ3, the gateway 10 notifies the management server 5 that DL has been normally completed (step S5). If update is to be automatically continued, the management server 5, which has received the DL completion notification, transmits a control program update request to the gateway 10. After the completion of the DL, the management server 5 may temporarily suspend the processing, and may transmit a control program update request to the gateway 10 upon receiving an update request from the outside (step S6).

Upon receiving the update request, the gateway 10 transmits a shift-to-repro-mode request to each of the ECUs 1 to 3 in order to update the control programs by using the update programs Δ1 to Δ3 stored in the storage unit 13 (step S7).

Upon receiving the shift-to-repro-mode request, each of the ECUs 1 to 3 switches its control mode from the normal mode to the reprogramming mode. Thus, the ECUs 1 to 3 become able to develop the update programs Δ1 to Δ3 and rewrite the current control programs to the new versions of control programs.

When there are a plurality of control programs to be simultaneously updated, the gateway 10 executes a scheduling process for determining a transmission order of the update programs Δ1 to Δ3 stored in the storage unit 13 (step S8).

When an update program Δ is transmitted to an ECU, the ECU executes completeness check, i.e., checks as to whether the update program Δ becomes deficient while being transmitted through the transmission path, by using MD (Message Digest) 5, CRC (Cyclic Redundancy Code), or the like. Then, the ECU executes confirmation of the owner of the original file by using a digital signature or the like to confirm that the original file has not been altered, and thereafter, develops (rewrites) the update program Δ to be applied to the old version. That is, update of a control program has three tasks, i.e., transmission from the gateway 10 to the corresponding ECU (first task), checking of the update file (second task), and development (update) of the program in the ECU (third task). A "required update time", which is a time required for update of the control program in each ECU, includes a time period (first time period) required for the first task, a time period (second time period) required for the second task, and a time period (third time period) required for the third task. When the operation for updating the control program consists of only the first to third tasks, the required update time is the sum of the first to third time periods (required update time=first time period+second time period+third time period).

When a plurality of control programs of a plurality of ECUs are simultaneously updated, a time period from start of transmission of the first update program to the corresponding ECU to completion of rewriting of a control program by the last update program in the corresponding ECU, is a "required simultaneous-update time" that is required for updating the control programs at the same timing. In other words, the required simultaneous-update time is a time period from start of the first time period of an update program to be transmitted first to the corresponding ECU, among the plurality of update programs, to end of the third time period of an update program with which rewriting of a control program is completed last, among the plurality of update programs.

When there are a plurality of control programs to be simultaneously updated, all the corresponding ECUs are maintained in the repro mode until updates of all the control programs are completed. That is, as long as the control program of at least one of the corresponding plurality of ECUs is being updated, all the plurality of ECUs are maintained in the repro mode. Accordingly, if the required simultaneous-update time is increased, return from the repro mode to the normal mode is delayed. Since the vehicle 1 cannot be used during the repro mode, if the repro mode continues for a long time when the user desires to drive the vehicle 1, the user suffers inconvenience and/or disadvantage. Therefore, in the program update system according to the present embodiment, when a plurality of control programs are simultaneously updated, a scheduling process is performed to reduce the required simultaneous-update time.

The scheduling process uses the first to third time periods regarding the update programs, and the topologies of the on-vehicle networks. The time periods required for the respective tasks of each update program may be provided from the management server 5 to the gateway 10. In this case, the management server 5 receives information regarding the update program from the DL server 6, and calculates the time periods required for the tasks. The information regarding the update program is, for example, the data size of the update program. Alternatively, the first to third time periods may be calculated in the gateway 10, based on the update program transmitted from the DL server 6, and information obtained from each ECU 30 or information of each of the components of the vehicle 1, which is stored in advance. The gateway 10 transmits the update programs stored in the storage unit 13 to the corresponding ECUs in accordance with the transmission order determined through the scheduling process in step S8 (steps S9, S11, S13).

Specifically, the gateway 10 transmits the update program Δ1, which is determined to be transmitted first, to the corresponding ECU 1 (step S9).

The ECU 1 develops the received update program Δ1 and applies the update program Δ1 to old version 1.0, thereby rewriting the control program from old version 1.0 to new version 1.2. When the rewriting is completed, the ECU 1 transmits a rewriting completion notification to the gateway 10 (step S10).

Next, the gateway 10 transmits the update program Δ2, which is determined to be transmitted next, to the corresponding ECU 2 (step S11).

The ECU 2 develops the received update program Δ2 and applies the update program Δ2 to old version 1.3, thereby rewriting the control program from old version 1.3 to new version 2.0. When the rewriting is completed, the ECU 2 transmits a rewriting completion notification to the gateway 10 (step S12).

Next, the gateway 10 transmits the update program Δ3, which is determined to be transmitted next, to the corresponding ECU 3 (step S13).

The ECU 3 develops the received update program Δ3 and applies the update program Δ3 to old version 2.0, thereby rewriting the control program from old version 2.0 to new version 2.2. When the rewriting is completed, the ECU 3 transmits a rewriting completion notification to the gateway 10 (step S14).

The transmission of the update programs Δ to the plurality of ECUs 30 in steps S9, S11, and S13 is performed in accordance with the transmission order determined through the scheduling process in step S8, as described above. The determined transmission order is not necessarily limited to transmitting the update programs Δ one by one to the plurality of ECUs 30. That is, a transmission order may be determined in which the respective update programs Δ are simultaneously transmitted to the plurality of ECUs 30. That is, step S9, S11, and S13 are not necessarily executed in this order, but the respective steps are executed in accordance with a defined transmission order, and may be simultaneously executed depending on the defined transmission order.

When the gateway 10 has received the rewriting completion notifications from all the ECUs 1 to 3, the gateway 10 transmits a shift-to-normal-mode request and a reset request to each of the ECUs 1 to 3 (step S15).

Upon receiving the shift-to-normal-mode request, each of the ECUs 1 to 3 switches its control mode from the repro mode to the normal mode, and reboots the system in response to the reset request. Thus, each of the ECUs 1 to 3 is operated by the new version of control program.

When the gateway 10 has received the rewriting completion notifications from all the ECUs 1 to 3, the gateway 10 transmits an update completion notification to the management server 5 (step S16).

Thus, the management server 5 recognizes that updates of the control programs of all the ECUs 1 to 3 in the vehicle 1 are completed.

[Scheduling Process]

Figure 6:
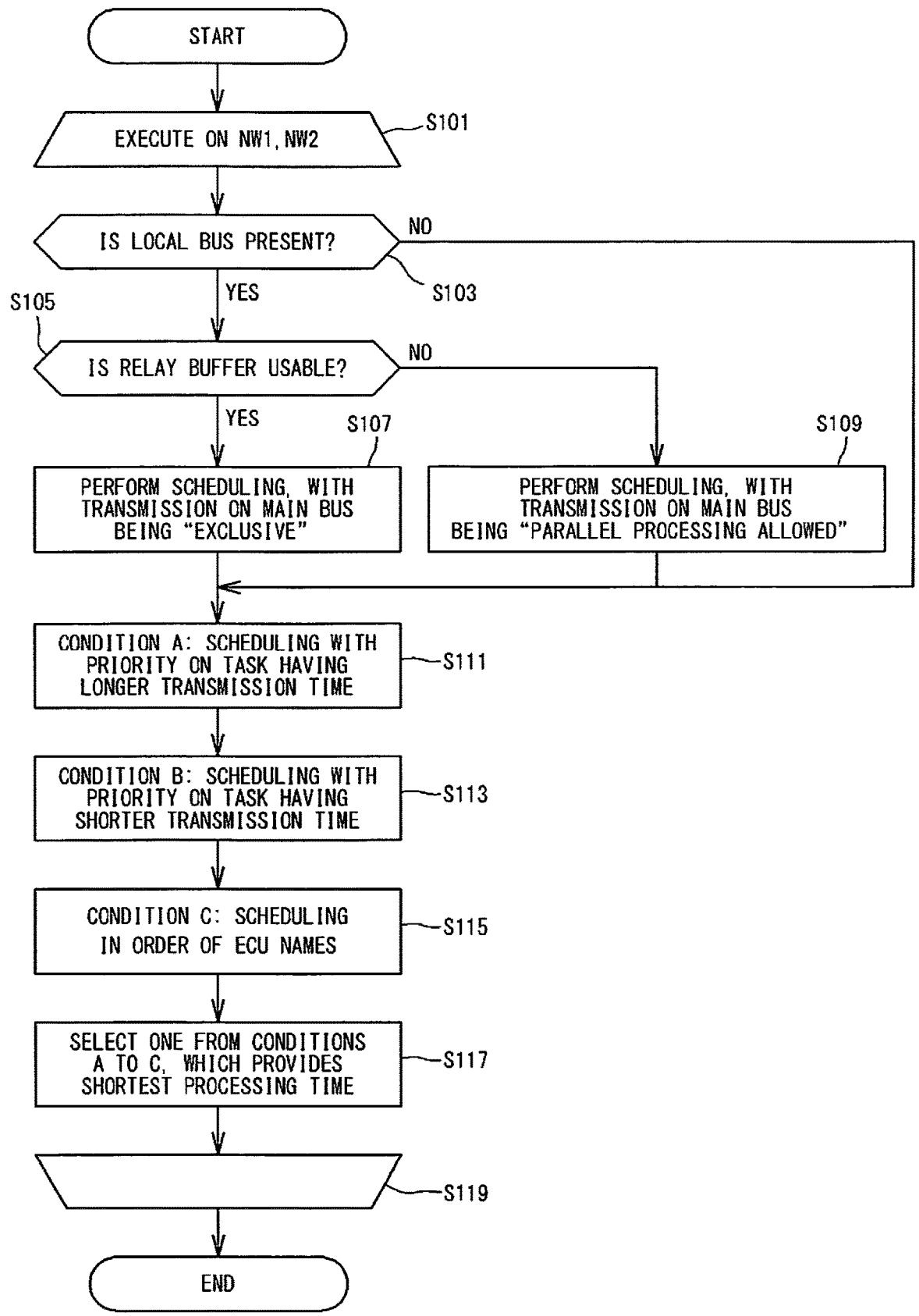
FIG. 6 is a flowchart showing a flow of a scheduling process in step S8 in FIG. 5.

FIG. 6 is a flowchart showing a flow of the scheduling process in step S8. The scheduling process shown in the flowchart of FIG. 6 is implemented when the CPU 11 of the gateway 10 reads out a program for executing the scheduling process, which is stored in the storage unit 13, to the RAM 12, and executes the read program. At this time, as shown in FIG. 2, the CPU 11 includes a scheduling section 111 and an update control section 112 which are functions to be implemented when the program is executed. The scheduling process is implemented when the CPU 11 exerts these functions. The operation shown in the flowchart of FIG. 6 is started when a plurality of update programs are obtained from the DL server 6 and there are a plurality of control programs to be simultaneously updated.

With reference to FIG. 6, the CPU 11 of the gateway 10 specifies a plurality of main buses NW1 and NW2 connected to the gateway 10, based on the topologies of the on-vehicle networks stored in the storage unit 13, and executes the scheduling process described below on each of the main buses NW1 and NW2 in parallel with each other (step S101).

First, based on the destinations of the plurality of update programs necessary for simultaneous update and on the topologies of the on-vehicle networks stored in the storage unit 13, the CPU 11 determines whether or not the plurality of update programs include an update program for an ECU that belongs to a local bus. In the example of FIG. 1, the CPU 11 determines whether or not the plurality of update programs include an update program for the ECU_D or the ECU_E.

When the plurality of update programs necessary for simultaneous update includes an update program for an ECU connected via the local bus (YES in step S103), the CPU 11 further determines whether or not the ECU (ECU_C), which is a branch node at which the main bus branches to the local bus, is able to use a relay buffer for relaying transmission of the update program, in other words, whether or not the ECU has a buffer function. A relay buffer is used for absorbing a difference in transmission capability (transmission speed) between the main bus and the local bus. In the example of FIG. 1, the CPU 11 determines whether or not the ECU_C is able to use a relay buffer.

When the ECU as the branch node is able to use a relay buffer (has a buffer function) (YES in step S105), the update program of the ECU that belongs to the local bus can be transmitted through the main bus, without taking into consideration the transmission speed in the local bus. In this case, the CPU 11 executes the scheduling process described below, on the assumption that transmission of an update program through the main bus (NW1) that branches to the local bus is exclusive, that is, the transmission path cannot be shared by transmissions of a plurality of update programs at the same time (step S107). When there is no difference in transmission speed between the main bus and the local bus or when the transmission speed in the local bus is higher than that in the main bus, the same scheduling process as in the case where the ECU as a branch node is able to use a relay buffer, is performed. Specifically, when the ECU_C is able to use a relay buffer, the CPU 11 performs the scheduling process described below, on the assumption that the main bus NW1 cannot be shared by transmissions of a plurality of update programs at the same time.

When the transmission speed in the local bus is lower than that in the main bus and the ECU as a branch node is not able to use a relay buffer (does not have a buffer function) (NO in step S105), transmission of an update program through the main bus has to be performed taking into consideration the transmission speed in the local bus, that is, at a speed according to the transmission speed in the local bus. In this case, the CPU 11 executes the scheduling process described below, on the assumption that update programs can be transmitted in parallel in the main bus (NW1), that is, the main bus can be shared, at the same time, by transmission of an update program to the ECU that belongs to the local bus, and transmission of another update program (step S109). Specifically, when the transmission speed in the local bus NW3 is lower than that in the main bus NW1 and the ECU_C cannot use a relay buffer, the CPU 11 performs the scheduling process described below, on the assumption that transmission of an update program in the local bus NW3 and transmission of another update program can be performed in parallel in the main bus NW1.

In any scheduling process, at a moment when transmission of an update program through a certain bus is finished, transmission of a next update program is started to prevent an idle band from being generated in the bus.

Specifically, the CPU 11 determines a transmission order of a plurality of update programs required for simultaneous update, in accordance with each of a plurality of scheduling conditions defined in advance (steps S111 to S115). For example, when a condition that "scheduling is performed so as to prioritize an update program having a longer update time" is defined as condition A, the CPU 11 determines a transmission order, based on the order of the required update times, each being the sum of the aforementioned first to third time periods, of the respective update programs (step S111). The transmission order determined based on the scheduling condition A is referred to as a transmission order A.

When a condition that "scheduling is performed so as to prioritize an update program having a shorter transmission time" is defined as condition B, the CPU 11 determines a transmission order, based on the order of the first time periods of the respective update programs (step S113). The transmission order determined based on the scheduling condition B is referred to as a transmission order B.

When a condition that "scheduling is performed according to order of identification information (e.g., names, IDs, etc.) assigned to ECUs" is defined as condition C, the CPU 11 determines a transmission order of the update programs, based on the names of the ECUs corresponding to the update programs (step S115). The transmission order determined based on the scheduling condition C is referred to as a transmission order C.

The CPU 11 executes the scheduling process in accordance with each of the plurality of scheduling conditions (conditions A to C) defined in advance, to determine a transmission order. Thereafter, the CPU 11 compares the results (transmission orders A to C) to select a transmission order having the shortest period required for simultaneous update, as a transmission order of the plurality of update programs (step S117). The CPU 11 executes the aforementioned scheduling process for each of the main buses NW1 and NW2 in parallel (step S119), and ends the series of processes in step S8.

After execution of the aforementioned scheduling process in step S8, the CPU 11, in steps S9, S11, and S13, executes update control including: transmitting the update programs to the corresponding ECUs in accordance with the determined transmission order; and instructing the ECUs to perform update. In order to execute the aforementioned scheduling process and update control, the CPU 11 includes the scheduling section 111 and the update control section 112 (FIG. 2). These sections 111 and 112 are functions implemented by the CPU 11 when the CPU 11 reads out the program stored in the storage unit 13 and executes the program on the RAM 12.

[Specific Example 1 of Scheduling Process]

FIG. 7 is a diagram showing a first specific example of a plurality of update programs required for simultaneous update. With reference to FIG. 7, in the first example, a first update program Δ1 is an update program for the ECU_A. The first update program Δ1 is transmitted to the ECU_A via the first main bus NW1 (first task), checking of the update file is executed in the ECU_A (second task), and the control program is rewritten in the ECU_A (third task). The first time period, the second time period, and the third time period are 30 [s (seconds)], 10 [s], and 30 [s], respectively. A second update program Δ2 is an update program for the ECU_F. The second update program Δ2 is transmitted to the ECU_F via the second main bus NW2 (first task), checking of the update file is executed in the ECU_F (second task), and the control program is rewritten in the ECU_F (third task). The first time period, the second time period, and the third time period are 10 [s], 10 [s], and 30 [s], respectively. A third update program Δ3 is an update program for the ECU_D. The third update program Δ3 is transmitted to the ECU_C via the first main bus NW1 and then transmitted to the ECU_D via the ECU_C and the local bus NW3 (first task), checking of the update file is executed in the ECU_D (second task), and the control program is rewritten in the ECU_D (third task). The first time period, the second time period, and the third time period are 60 [s], 10 [s], and 30 [s], respectively. As for the transmission (first task) of the update program Δ3, the time required for transmission in the first main bus NW1 is 30 [s] and the time required for transmission in the local bus NW3 is 30 [s]. The ECU_C that relays transmission from the main bus NW1 to the local bus NW3 is able to use a relay buffer, and the relay time for transmission from the main bus NW1 to the local bus NW3 is 10 [s].

When the plurality of update programs Δ1 to Δ3 necessary for simultaneous update are as shown in FIG. 7, the CPU 11 of the gateway 10 determines "YES" in step S103 and "YES" in step S107. Therefore, on the assumption that transmission of an update program through the main bus NW1 is exclusive (step S107), the CPU 11 executes a scheduling process using each of the scheduling conditions (conditions A to C) defined in advance.

Figure 8:
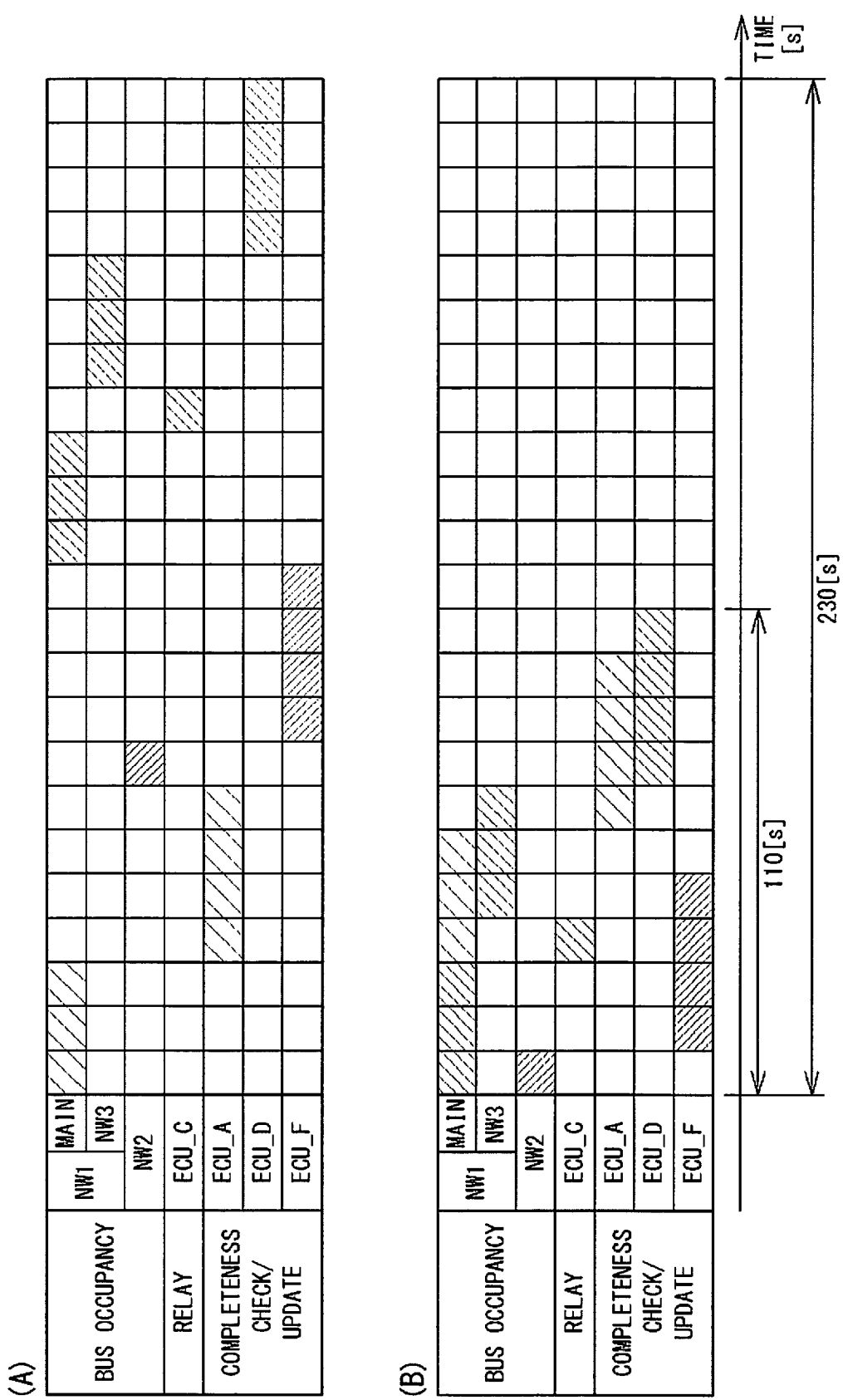
FIG. 8 is a diagram showing an update schedule (A) in the case where the scheduling process is not performed and an update schedule (B) in the case where the scheduling process is performed, in comparison with each other.

FIG. 8 is a diagram showing an update schedule (A) in the case where the scheduling process in step S8 is not performed and an update schedule (B) in the case where the scheduling process is performed, in comparison with each other. The horizontal axis indicates time [s], and each of blocks in (A), (B) represents 10 [s].

First, with reference to (A), for example, when the CPU 11 performs update control such that an update process is completed for each of the update programs in order of the update programs (Δ1→Δ2→Δ3), the required simultaneous-update time is the sum of the required update times in the respective ECUs, that is, the sum of the time periods required for the respective tasks shown in FIG. 7, which is 230 [s].

On the other hand, when the scheduling process in step S8 is executed, as for the main bus NW1, a transmission order is determined such that transmission of the update program Δ3 to be (diverged and) transmitted through the local bus NW3 is performed preferentially to transmission of the update program Δ1 that does not use the local bus NW3 (that is not diverged), and the update programs Δ3 and Δ1 are sequentially transmitted through the main bus NW1. As for the main bus NW2 capable of transmission in parallel with the main bus NW1, a transmission order is determined such that the update program Δ2 is transmitted through the main bus NW2 in parallel with transmission of the update program through the main bus NW1 (refer to (B)). This is because, based on the topologies of the on-vehicle networks, update programs are transmitted in parallel with each other through the independent main buses NW1 and NW2, and a plurality of update programs have to be sequentially transmitted one by one through the same main bus. Therefore, as for the main bus (NW1) that branches to the local bus, the update program to be diverged to and transmitted through the local bus (NW3) is preferentially transmitted. Thus, transmission, through the main bus, of the update program that is not diverged to the local bus (NW3) and transmission of the update program through the local bus (NW3), can be performed in parallel with each other. Thus, the time required for transmission, of the required simultaneous-update time, can be made shorter than the sum of the respective first time periods of the plurality of update programs, resulting in a reduction in the required simultaneous-update time. Checking of the update file (second task) and update (third task), which follow transmission (first task), are sequentially executed after the transmission is ended. The same applies to the specific examples of scheduling processes described below.

When the plurality of update programs Δ1 to Δ3 necessary for simultaneous update are as shown in FIG. 7, the CPU 11 executes the scheduling process in step S8 to determine the schedule shown in (B) of FIG. 8, whereby the required simultaneous-update time is significantly reduced from 230 [s] to 110 [s].

[Specific Example 2 of Scheduling Process]

FIG. 9 is a diagram showing a second specific example of update programs required for simultaneous update. With reference to FIG. 9, in this second example, a first update program Δ1 is an update program for the ECU_A. The first update program Δ1 is transmitted to the ECU_A via the first main bus NW1 (first task), checking of the update file is executed in the ECU_A (second task), and the control program is rewritten in the ECU_A (third task). The first time period, the second time period, and the third time period are 30 [s], 10 [s], and 30 [s], respectively. A second update program Δ2 is an update program for the ECU_F. The second update program Δ2 is transmitted to the ECU_F via the second main bus NW2 (first task), checking of the update file is executed in the ECU_F (second task), and the control program is rewritten in the ECU_F (third task). The first time period, the second time period, and the third time period are 10 [s], 10 [s], and 30 [s], respectively. A third update program Δ3 is an update program for the ECU_D. The third update program Δ3 is transmitted to the ECU_C via the first main bus NW1 and then transmitted to the ECU_D via the ECU_C and the local bus NW3 (first task), checking of the update file is executed in the ECU_D (second task), and the control program is rewritten in the ECU_D (third task). The first time period, the second time period, and the third time period are 120 [s], 10 [s], and 20 [s], respectively. In this second example, the ECU_C that relays transmission from the main bus NW1 to the local bus NW3 is not able to use a relay buffer (has no buffer function). Therefore, as for transmission of the update program Δ3 for the ECU_D, the update program Δ3 is transmitted through the first main bus NW1 at the same speed as the transmission speed in the local bus NW3, whereby the time required for transmission through the first main bus NW1 is the same as the time required for transmission through the local bus NW3, which is 120 [s].

When the plurality of update programs Δ1 to Δ3 necessary for simultaneous update are as shown in FIG. 9, the CPU 11 of the gateway 10 determines "YES" in step S103 and "NO" in step S107. Therefore, on the assumption that, in the main bus NW1, the update program to be diverged to and transmitted through the local bus NW3 can be transmitted in parallel with another update program (step S109), the CPU 11 executes a scheduling process using each of the scheduling conditions (conditions A to C) defined in advance.

Figure 10:
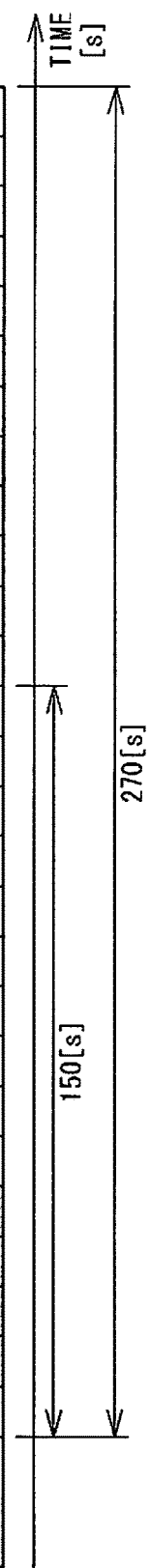
FIG. 10 is a diagram showing an update schedule (A) in the case where the scheduling process is not performed and an update schedule (B) in the case where the scheduling process is performed, in comparison with each other.

FIG. 10 is a diagram showing an update schedule (A) in the case where the scheduling process in step S8 is not performed and an update schedule (B) in the case where the scheduling process is performed, in comparison with each other. The horizontal axis indicates time [s], and each of blocks in (A), (B) represents 10 [s].

First, with reference to (A), for example, when the CPU 11 performs update control such that the update process is completed for each of the update programs in order of the update programs (Δ1→Δ2→Δ3), the required simultaneous-update time is the sum of the required update times in the respective ECUs, that is, the sum of the time periods required for the respective tasks shown in FIG. 9, which is 270 [s].

On the other hand, when the scheduling process in step S8 is executed, as for the main bus NW1, transmission of the update program Δ3 to be diverged to and transmitted through the local bus NW3 is preferentially performed. As for the main bus NW2 capable of transmission in parallel with the main bus NW1, a transmission order is determined such that the update program Δ2 is transmitted in parallel with transmission of the update program through the main bus NW1.

These are based on the same idea as in the first specific example of the scheduling process shown in FIG. 8. Further, as for the main bus NW1, a transmission order is determined such that the update program Δ1 is transmitted in parallel with transmission of the update program Δ3 (refer to (B)). This is because, when the update program Δ3 is transmitted through the main bus NW1, the transmission speed or the transmission timing is adjusted to the transmission speed in the local bus NW3, whereby an idle band generated in the main bus NW1 as a transmission path is used for transmission of the update program Δ1. In this case, the idle band in the main bus NW1, which is generated when the update program Δ3 is transmitted through the main bus NW1, is used for transmission of the update program Δ1. That is, the update program Δ1 and the update program Δ3 share the transmission band of the main bus NW1. Therefore, although transmission of the update program Δ1 is usually completed in 30 [s], a transmission time of 60 [s] is needed because the transmission band is halved due to the sharing with the update program Δ3. Thus, the time required for transmission, of the required simultaneous-update time, can be made shorter than the sum of the time periods required for transmissions of the plurality of update programs, resulting in a reduction in the required simultaneous-update time.

When the plurality of update programs Δ1 to Δ3 necessary for simultaneous update are as shown in FIG. 9, the CPU 11 executes the scheduling process in step S8 to determine the schedule shown in (B) of FIG. 10, whereby the required simultaneous-update time is significantly reduced from 270 [s] to 150 [s].

[Specific Example 3 of Scheduling Process]

FIG. 11 is a diagram showing a third specific example of update programs necessary for simultaneous update. With reference to FIG. 11, in this third example, a first update program Δ1 is an update program for the ECU_A. The first update program Δ1 is transmitted to the ECU_A via the first main bus NW1 (first task), checking of the update file is executed in the ECU_A (second task), and the control program is rewritten in the ECU_A (third task). The first time period, the second time period, and the third time period are 30 [s], 20 [s], and 40 [s], respectively. A second update program Δ2 is an update program for the ECU_B. The second update program Δ2 is transmitted to the ECU_B via the first main bus NW1 (first task), checking of the update file is executed in the ECU_B (second task), and the control program is rewritten in the ECU_B (third task). The first time period, the second time period, and the third time period are 10 [s], 10 [s], and 20 [s], respectively. A third update program Δ3 is an update program for the ECU_C. The third update program Δ3 is transmitted to the ECU_C via the first main bus NW1 (first task), checking of the update file is executed in the ECU_C (second task), and the control program is rewritten in the ECU_C (third task). The first time period, the second time period, and the third time period are 20 [s], 10 [s], and 50 [s], respectively. That is, all the plurality of update programs Δ1 to Δ3 are update programs for the ECUs that belong to the first main bus NW1, and are transmitted to the corresponding ECUs through only the main bus NW1.

When the plurality of update programs Δ1 to Δ3 necessary for simultaneous update are as shown in FIG. 11, the CPU 11 of the gateway 10 determines "NO" in step S103, and therefore, the CPU 11 executes the scheduling process using each of the scheduling conditions (conditions A to C) defined in advance, without assuming any of the aforementioned steps S107 and S109.

FIG. 12 is a diagram showing an update schedule (A) in the case where the scheduling process in step S8 is not performed and update schedules (B) to (D) in the case where scheduling processes according to the aforementioned conditions A to C are performed, in comparison with each other. The horizontal axis indicates time [s], and each of blocks in (A) to (D) represents 10 [s].

First, with reference to (A), for example, when the CPU 11 performs update control such that the update process is completed for each of the update programs in order of the update programs (Δ1→Δ2→Δ3), the required simultaneous-update time is the sum of the required update times in the respective ECUs, that is, the sum of the time periods required for the respective tasks shown in FIG. 11, which is 210 [s].

On the other hand, when the scheduling process is executed according to the condition A, a transmission order A is determined such that the update programs are sequentially transmitted through the main bus NW1 in descending order of the length of the third time period (Δ3→Δ1→Δ2) (refer to (B)). The above condition A can also be interpreted as "scheduling is performed so as to prioritize an update program having a longer processing time in an ECU that receives the update program". The processing in the ECU that receives the update program includes checking of the update file (second task) and rewriting of the control program (third task). When the above interpretation is adopted, the transmission order A may be determined in descending order of the sum of the second time period and the third time period required for these tasks (Δ1→Δ3→Δ2). In this case, each update program is transmitted through the main bus NW1 while another update program is subjected to update file checking (second task) and control program rewriting (third task) in the corresponding ECU. In the case of the condition A, for an update program having the longer third time or the longer sum of the second time and the third time, the second task and the third task thereof are started earlier. Therefore, update of the control program using the last update program is highly likely to be completed earlier. In the case of the transmission order A shown in (B) of FIG. 12, the required simultaneous-update time is 110 [s].

When the scheduling process is executed according to the condition B, a transmission order B is determined such that the update programs are sequentially transmitted through the main bus NW1 in ascending order of the first time period (Δ2→Δ3→Δ1) (refer to (C)). Also in this case, each update program is transmitted through the main bus NW1 while another update program is subjected to update file checking (second task) and control program rewriting (third task) in the corresponding ECU. In the case of the condition B, for each update program, start of the second task after transmission (first task) can proceed earliest. In the case of the transmission order B shown in (C) of FIG. 12, the required simultaneous-update time is 120 [s].

When the scheduling process is executed according to the above condition C, a transmission order C is determined such that the update programs are sequentially transmitted through the main bus NW1 in order of the names of the corresponding ECUs (Δ1→Δ2→Δ3) (refer to (D)). Also in this case, each update program is transmitted through the main bus NW1 while another update program is subjected to update file checking (second task) and control program rewriting (third task) in the corresponding ECU. In the case of the transmission order C shown in (D) of FIG. 12, the required simultaneous-update time is 120 [s].

As the result of the aforementioned scheduling process, when the plurality of update programs Δ1 to Δ3 necessary for simultaneous update are as shown in FIG. 11, the schedule condition that allows the required simultaneous-update time to be minimized is the condition A among the transmission orders A to C. Therefore, in step S8, the gateway 10 determines, as a transmission order of the update programs Δ1 to Δ3, the transmission order A shown in (B) of FIG. 12. Thus, the required simultaneous-update time is significantly reduced from 210 [s] to 110 [s].

Effects of First Embodiment

According to the program update system of the first embodiment, when simultaneous update of control programs of a plurality of ECUs is performed, a scheduling process for determining a transmission order of a plurality of update programs is executed, in the gateway 10 which is a relay device for relaying transmission of the update programs from the DL server 6 which is an external device providing the update programs, to the ECUs 30.

When a plurality of update programs necessary for simultaneous update include update programs for ECUs that belong to on-vehicle networks that are individually connected to the gateway 10 and are independent from each other, the gateway 10 transmits these update programs to the main buses (NW1, NW2) in parallel with each other.

When a plurality of update programs necessary for simultaneous update include a plurality of update programs for a plurality of ECUs that belong to the same on-vehicle network, the gateway 10 executes a scheduling process in accordance with each of conditions (a plurality of scheduling conditions) defined in advance. Then, the gateway 10 selects, as a transmission order of the plurality of update programs, a transmission order that allows the required simultaneous-update time to be minimized, among a plurality of transmission orders obtained through the scheduling process. For example, when there are a plurality of update programs to be transmitted through the same main bus (NW1) and the plurality of update programs include an update program to be diverged to and transmitted through a local bus, the gateway 10 preferentially transmits an update program, which is to be transmitted to an ECU that belongs to the local bus with an ECU that belongs to the main bus being a branch node, over update programs to be transmitted to the ECUs that belong to the main bus. At this time, depending on whether or not the ECU serving as the branch node has a buffer function, the gateway 10 assumes that transmission of update programs through the same main bus (NW1) is exclusive or that parallel transmission of update programs is allowed.

Thus, the required simultaneous-update time can be reduced.

While a plurality of control programs that should be simultaneously updated are under update processing, all the corresponding ECUs are in the repro mode and do not return to the normal mode until the update processing is completed throughout and the ECUs are rebooted. Therefore, as the required simultaneous-update time is increased, inconvenience and/or disadvantage of the user, such that the user cannot drive the vehicle when he/she wants to, are more likely to occur. Therefore, when the scheduling process is executed in the gateway 10 as described above and the transmission order that allows the required simultaneous-update time to be ended earliest is determined, such inconvenience and/or disadvantage of the user can be inhibited.

Second Embodiment

The aforementioned scheduling process may be performed in any relay device that relays an update program being transmitted from the DL server 6 to an ECU 30. For example, when an update program being transmitted from the DL server 6 to each ECU 30 is relayed by a further relay device (not shown in FIG. 1) in addition to the gateway 10, the aforementioned scheduling process may be executed in the further relay device. Alternatively, the scheduling process may be implemented by the cooperation of the gateway 10 and the further relay device.

As shown in FIG. 5, when an update program is to be transmitted from the DL server 6 to an ECU 30, the management server 5 transmits a download request to the gateway 10 (step S3), and the gateway 10 requests the update program from the DL server 6 in response to the download request, whereby the update program is transmitted from the DL server 6 to the gateway 10 (step S4). Then, the management server 5 transmits a request of update in each ECU 30 to the gateway 10 (step S6), and the gateway 10 requests each ECU 30 to perform update in response to the request of update, whereby the update program is transmitted from the gateway 10 to the ECU 30 and the control program is updated (steps S7, S9, S11, S13). According to this flow, it can be said that the management server 5 also serves as a part of a relay device that relays transmission of an update program from the DL server 6 to each ECU 30.

Therefore, the aforementioned scheduling process may be executed in the management server 5 that may be regarded as a kind of a relay device, and information indicating the determined transmission order may be transmitted to the gateway 10 together with the update programs in step S4. Alternatively, since the management server 5 and the DL server 6 may be implemented as a single server unit as described above, the scheduling process may be executed in the server unit having the functions of the servers 5 and 6. In this case, the scheduling section 111 and the update control section 112 (FIG. 2), which are the functions to execute the aforementioned scheduling process, are implemented by the CPU 51 of the management server 5 when the CPU 51 reads out the program stored in the ROM 52 to the RAM 53 and executes the program. That is, the management server 5 obtains update programs or information regarding the update programs from the DL server 6 and stores them in the storage unit 54. The scheduling section 111 of the management server 5 performs the scheduling process by using the information regarding the update programs stored in the storage unit 54. The update control section 112 provides the transmission order determined by the scheduling section 111 to the gateway 10, and requests an update process in each ECU 30. The update control section 112 of the gateway 10 transmits the update programs according to the transmission order received from the management server 5, and requests each ECU 30 to perform the update process, thereby controlling the simultaneous update processing.

Also in the program update system according to the second embodiment, when there are a plurality of update programs necessary for simultaneous update, the required simultaneous-update time can be reduced. Thus, inconvenience and disadvantage of the user can be inhibited.

It is noted that the embodiments disclosed herein are merely illustrative in all aspects and should not be recognized as being restrictive. The scope of the present disclosure is defined by the scope of the claims rather than the meaning described above, and is intended to include meaning equivalent to the scope of the claims and all modifications within the scope.

REFERENCE SIGNS LIST 1 vehicle
2 wide-area communication network 5 management server (relay device)
6 DL server
10 gateway (relay device)
11 CPU
12 RAM
13 storage unit
14 in-vehicle communication unit
15 wireless communication unit
30 ECU (control device)
31 CPU
32 RAM
33 storage unit
34 communication unit
35 start-up unit
51 CPU
52 ROM
53 RAM
54 storage unit
55 communication unit
NW1 to NW3 bus (on-vehicle network)
111 scheduling section
112 update control section

The invention claimed is:

1. A relay device communicating with a plurality of control devices that belong to on-vehicle networks, the relay device comprising:
a storage unit configured to store therein a plurality of update programs and topologies of the on-vehicle networks, the plurality of update programs being to be respectively applied to the plurality of control devices in mutually overlapping timing;
an in-vehicle communication unit configured to transmit the plurality of update programs to the corresponding control devices, respectively; and
a control unit configured to control the in-vehicle communication unit to parallelly transmit, based on the topologies, the plurality of update programs to control devices that belong to a plurality of on-vehicle networks that are individually connected to the relay device and are independent from each other, the plurality of update programs corresponding to the control devices, wherein
one of the on-vehicle networks includes a main network directly connected to the relay device, and a local network that branches from the main network with a control device included in the main network being a branch node, and,
when transmission capability of the main network is higher than transmission capability of the local network, the control unit determines a transmission speed in the main network in accordance with whether or not the branch node has a buffer function for relaying transmission of the update program from the main network to the local network.

2. The relay device according to claim 1, wherein
the control unit determines a transmission order of the plurality of update programs in accordance with a predetermined condition.

3. The relay device according to claim 2, wherein
the predetermined condition is a scheduling condition that allows a required simultaneous-update time to be minimized, the required simultaneous-update time being a combination of a first time period, a second time period, and a third time period, in each of the control devices, and
the required simultaneous-update time is a time period from the start of the first time period with respect to an update program to be transmitted first to a corresponding control device, among the plurality of update programs, to the end of the third time period with respect to an update program with which rewriting of a control program is completed last, among the plurality of update programs,
wherein
a first time period specifies a transmission time of each update program,
a second time period specifies a time required for checking of each update program, and
a third time period specifies a time required for rewriting a control program using each update program.

4. The relay device according to claim 3, wherein
the scheduling condition includes a condition that, as for a plurality of control devices included in one of the on-vehicle networks which is a bus-type topology, a control device having a longer third time period is given an update program earlier in the transmission order of the update programs.

5. The relay device according to claim 3, wherein
the scheduling condition includes a condition that, as for a plurality of control devices included in one of the on-vehicle networks which is a bus-type topology, a control device having a shorter first time period is given an update program earlier in the transmission order of the update programs.

6. The relay device according to claim 3, wherein
the scheduling condition includes a condition that, as for a plurality of control devices included in one of the on-vehicle networks which is a bus-type topology, the transmission order is determined based on identification information assigned to the control devices.

7. The relay device according to claim 3, wherein
the scheduling condition includes a condition that transmission to a control device that belongs to the local network is performed earlier than transmission to the control device that belongs to the main network.

8. A program update system comprising a plurality of control devices belonging to on-vehicle networks, and a relay device communicating with the plurality of control devices,
the relay device including:
a storage unit configured to store therein a plurality of update programs and topologies of the on-vehicle networks, the plurality of update programs being to be respectively applied to the plurality of control devices in mutually overlapping timing;
an in-vehicle communication unit configured to transmit the plurality of update programs to the corresponding control devices, respectively; and
a control unit configured to control the in-vehicle communication unit to parallelly transmit, based on the topologies, the plurality of update programs to control devices that belong to a plurality of on-vehicle networks that are individually connected to the relay device and are independent from each other, the plurality of update programs corresponding to the control devices, wherein
one of the on-vehicle networks includes a main network directly connected to the relay device, and a local network that branches from the main network with a control device included in the main network being a branch node, and,
when transmission capability of the main network is higher than transmission capability of the local network, the control unit determines a transmission speed in the main network in accordance with whether or not the branch node has a buffer function for relaying transmission of the update program from the main network to the local network.

9. A program update method executed by a relay device communicating with a plurality of control devices that belong to on-vehicle networks, the method comprising the steps of:

storing a plurality of update programs and topologies of the on-vehicle networks, the plurality of update programs being to be respectively applied to the plurality of control devices in mutually overlapping timing; and transmitting the plurality of update programs to the corresponding control devices, respectively, wherein in the step of transmitting the plurality of update programs, the plurality of update programs corresponding to the control devices are parallelly transmitted to control devices that belong to a plurality of on-vehicle networks that are individually connected to the relay device and are independent from each other, wherein one of the on-vehicle networks includes a main network directly connected to the relay device, and a local network that branches from the main network with a control device included in the main network being a branch node, and, the method further comprises the step of determining a transmission speed in the main network in accordance with whether or not the branch node has a buffer function for relaying transmission of the update program from the main network to the local network when transmission capability of the main network is higher than transmission capability of the local network.

* * * * *